United States Patent [19]

Marsh

[11] 4,156,547

[45] May 29, 1979

[54] SPEED-RESPONSIVE ANTI-SKID AND ANTI-SPIN SYSTEM FOR VEHICLES

[75] Inventor: Jeffrey D. Marsh, Plymouth, Mich.

[73] Assignee: Aspro, Inc., Westport, Conn.

[21] Appl. No.: 826,980

[22] Filed: Aug. 23, 1977

[51] Int. Cl.² .............................................. B60T 8/02
[52] U.S. Cl. ......................................... 303/96; 74/711;
180/82 D; 303/106; 303/118
[58] Field of Search ................. 74/711; 180/75, 82 R,
180/82 D; 303/96, 97, 105–106, 109, 117–119;
188/181

[56] References Cited

U.S. PATENT DOCUMENTS

| 3,017,145 | 1/1962 | Yarber | 303/105 X |
|---|---|---|---|
| 3,025,722 | 3/1962 | Eger et al. | 74/711 |
| 3,253,672 | 5/1966 | Mikina | 180/75 |
| 3,288,232 | 11/1966 | Shepherd | 303/96 X |
| 3,511,542 | 5/1970 | Fielek, Jr. | 303/97 |
| 3,602,554 | 8/1971 | Ichimura et al. | 303/96 X |
| 3,608,978 | 9/1971 | Neisch | 303/96 |
| 3,617,099 | 11/1971 | Sugiyama | 303/96 |
| 3,620,577 | 11/1971 | Neisch et al. | 303/96 |
| 3,706,351 | 12/1972 | Neisch | 180/75 |
| 3,744,851 | 7/1973 | Burckhardt et al. | 303/106 |
| 3,762,774 | 10/1973 | Burckhardt et al. | 303/96 |
| 3,768,519 | 10/1973 | Morse | 303/118 X |
| 3,771,839 | 11/1973 | Fink | 303/105 |
| 3,797,893 | 3/1974 | Burckhardt et al. | 303/106 |
| 3,857,615 | 12/1974 | Acar | 303/118 |
| 3,981,545 | 9/1976 | Eddy | 303/96 |
| 4,025,127 | 5/1977 | Rembold | 303/118 |

FOREIGN PATENT DOCUMENTS 2522878 11/1975 Fed. Rep. of Germany ............ 303/96

*Primary Examiner*—Stephen G. Kunin
*Attorney, Agent, or Firm*—Lawrence E. Laubscher

[57] ABSTRACT

A skid-control traction-control system is provided for a motor vehicle including at least two driven wheels connected by a differential mechanism, characterized by the provision of a skid-control solenoid valve operable—when the vehicle is decelerating and either driven wheel has a rotational deceleration which differs from an estimated predetermined amount—for automatically deactivating the brakes associated with both driven wheels, in combination with a system operable—when the vehicle is accelerating and one driven wheel has a rotational velocity which differs from the other by a predetermined amount—for automatically braking only the faster driven wheel, thereby causing torque to be transferred to the slower wheel via the differential mechanism.

8 Claims, 5 Drawing Figures

SPEED-RESPONSIVE ANTI-SKID AND ANTI-SPIN SYSTEM FOR VEHICLES

BRIEF DESCRIPTION OF THE PRIOR ART

Vehicle traction control systems of the anti-spin type including means for automatically braking a driven wheel which has a greater rotational velocity than another driven wheel that is connected thereto through a differential are well known in the patented prior art, as evidenced, for example, by the patents to Eger et al U.S. Pat. No. 3,025,722, Mikina U.S. Pat. No. 3,253,672, Sugiyama U.S. Pat. No. 3,617,099 and Eddy U.S. Pat. No. 3,981,545, among others.

Similarly, vehicle systems of the anti-skid type for limiting the braking effect when the vehicle is decelerating and the deceleration of one wheel exceeds that of an estimated predetermined amount are known in the art, as taught, for example, by the patents to Neisch U.S. Pat. No. 3,608,978, Neisch et al U.S. Pat. No. 3,620,577 and Burckhardt et al U.S. Pat. Nos. 3,744,851, 3,762,774 and 3,797,893, among others.

In the Fink U.S. Pat. No. 3,771,839, a combined anti-skid anti-spin vehicle brake control system is disclosed which is driver-operated to prevent the transmission of the full drive force on to only one drive wheel when starting. An arrangement is coupled to the anti-skid system in response to acceleration of the one of the pair of wheels exceeding an acceleration threshold greater than an acceleration threshold normally employed in the anti-skid system to apply brake pressure to the wheel brake cylinder associated with one of the driven wheels. The electric circuit in which the additional threshold circuit is connected is closed by means of a switch actuated by the driver, thereby achieving a desired differential lock.

SUMMARY OF THE INVENTION

The primary object of the invention is to provide an improved fully-automatic anti-skid anti-spin traction control system including anti-skid solenoid means operable—when the vehicle is in a decelerating condition and the rotational deceleration of either driven wheel exceeds an estimated predetermined value—for deactivating the wheel brake means associated with both of the driven wheels, respectively, and brake solenoid means operable—when the vehicle is in an accelerating condition and the rotational velocity of one driven wheel exceeds that of another driven wheel by a second predetermined amount—to brake the faster driven wheel, thereby to transfer torque to the slower driven wheel via the differential mechanism.

In accordance with another object of the invention, the control system includes a relay valve having pressure motor means for controlling the supply of fluid to both of the wheel brake means, and pilot conduit means including an operator-controlled valve (such as a foot-operated treadle valve) for supplying pilot pressure fluid to the working chamber of the pressure motor means. The pressure motor means may be of the piston-cylinder type or the diaphragm type, and the path for supplying pressure fluid to the working chamber includes a skid-control solenoid valve operable between enabling and disabling conditions in which the working chamber is pressurized and vented, respectively. When the working chamber is vented, a valve operator member carried by the movable member of the pressure means is displaced to a position opening main vent means for simultaneously venting both of the brake fluid pressure lines to exhaust, thereby deactivating both wheel brake means associated with the pair of driven wheels. In order to provide the desired traction control operation, a normally-closed by-pass conduit is connected between the pilot and brake fluid supply conduits so that when the vehicle is in the traction-control mode, the operator-controlled valve means is disabled, and the by-pass conduit is opened, thereby to supply to the working chamber of the pressure motor means the pressure fluid necessary to achieve the desired traction control selective braking operation.

In accordance with a further object of the invention, in a preferred embodiment, the skid-control and traction-control solenoid means are mounted in a single unitary housing, a pair of additional chambers being provided between the pressure fluid supply chamber and the outlet ports that are connected with the wheel brake means associated with the driven wheels, respectively. A pair of floating valve means are mounted in these additional chambers, respectively, which are operable by the respective traction control solenoids toward positions in which the outlet port associated with the slower driven wheel is isolated from the pressure fluid source, and the outlet port associated with the faster driven wheel is supplied with pressure fluid via valve seat means which are opened by the wheel brake solenoid associated with the faster wheel, thereby to achieve braking of the same.

According to another object of the invention, first spool valve means are provided for connecting the working chamber of the pressure motor means with the source via the operator-controlled valve during anti-skid operation, and for connecting the working chamber with the source directly through a by-pass conduit when the vehicle is in the traction control mode. Second spool valve means are provided for connecting one outlet port of the relay valve means with the wheel brake means associated with the faster driven wheel, and for isolating the other outlet port from the wheel brake means associated with the slower wheel, thereby to deactivate the same.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
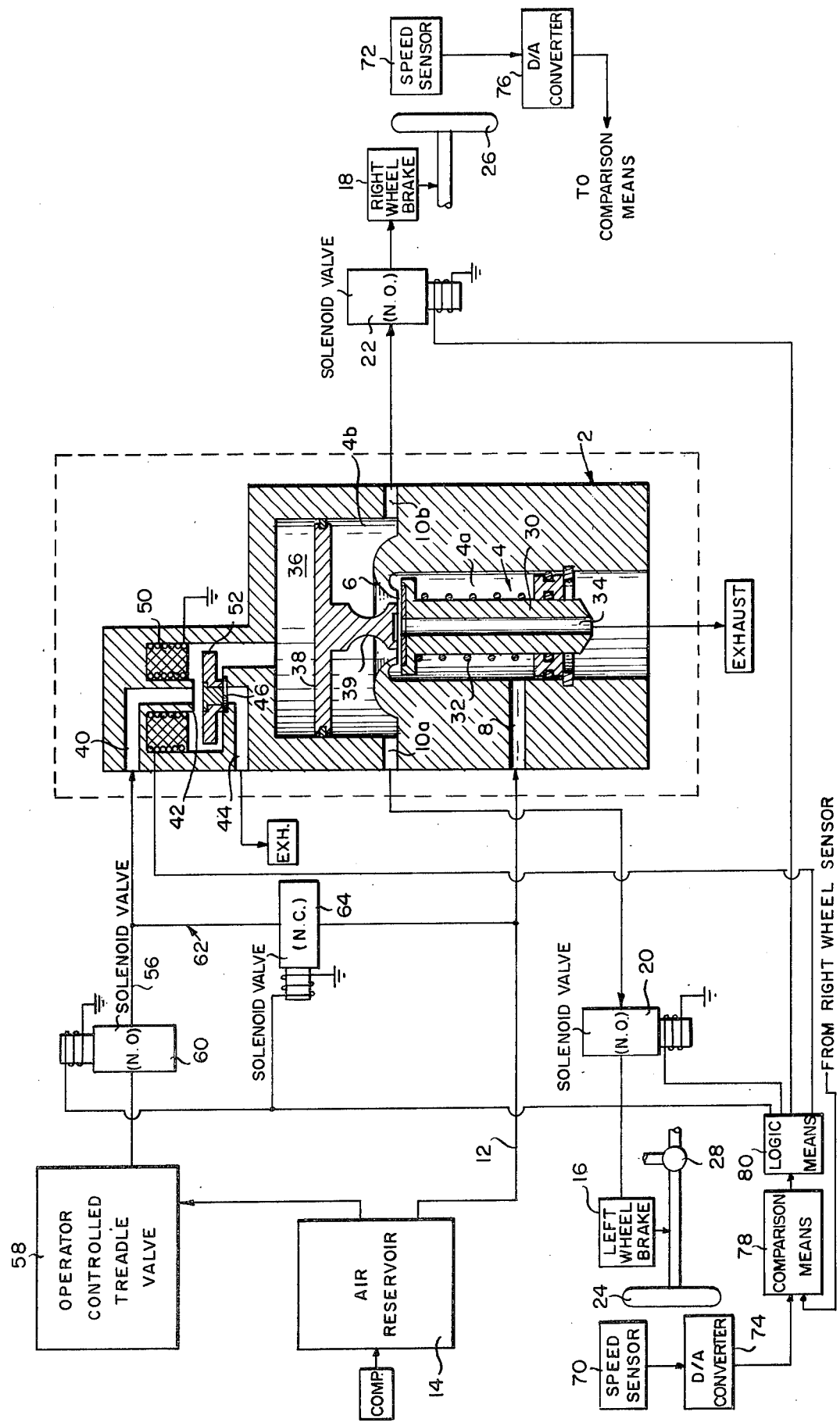
FIG. 1 is a somewhat diagrammatic illustration of a first embodiment of the skid-control traction-control system of the present invention.

Referring first more particularly to FIG. 1, the anti-skid anti-spin control system of the present invention includes a relay valve housing 2 containing a chamber 4 that is divided into first and second chamber portions 4a and 4b by a valve seat 6. Inlet opening 8 is in communication with the first chamber portion 4a and a pair of outlets 10a, 10b are in communication with the second chamber portion 4b. The inlet 8 is connected by first conduit means 12 with a source 14 of pressure fluid, such as air, and the outlet ports 10a, 10b are connected with the left and right wheel brake means 16 and 18 via normally open solenoid valves 20 and 22, respectively. As is known in the art, the left and right wheel brake means are operable to brake the left and right driven wheels 24 and 26 that are connected by a conventional differential mechanism 28.

Mounted for sliding movement within the first chamber portion 4a is a relay valve member 30 that is normally biased toward the closed position relative to the valve seat 6 by spring means 32, thereby to isolate the inlet 8 from the second chamber portion 4b. The relay valve member 30 contains a longitudinal through bore 34 the lower end of which is connected with an exhaust. Mounted in a working chamber 36 contained within the housing 2 are pressure motor means of the piston-cylinder type including a piston 38 which carries a valve operating stem 39 that extends downwardly and terminates adjacent the upper end of the relay valve member 30. The working chamber 36 communicates with a second inlet opening 40 via valve seat 42, and also with the exhaust outlet 44 via a second valve seat 46. Skid-control solenoid valve means including a skid-control solenoid 50 and a valve member 52 are provided for alternately connecting the working chamber 36 with the second inlet 40 and the exhaust outlet 44. More particularly, when the solenoid 50 is energized, valve seat 42 is closed by the armature member 52 and when solenoid 50 is de-energized the armature member 52 closes the exhaust valve seat 46. The second inlet 40 is connected with the pressure fluid source 14 by pilot conduit means 56 containing the operator-controlled treadle valve 58 and a normally open pilot solenoid valve 60. Connected between the first and second inlets 8 and 40 is a by-pass conduit 62 containing normally closed by-pass solenoid valve 64.

Speed sensor means 70 and 72 of the magnetic pickup type are associated with the left and right driven wheels, respectively, for providing wheel velocity signals via digital to analog converter means 74 and 76 to comparison means 78 that provide an appropriate signal to logic means 80 for controlling the operation of skid-control solenoid valve means 50, 52, the left and right wheel brake solenoid valves 20 and 22, and the solenoid valves 60, 64, and 66, as will be described in greater detail below.

Figure 2:
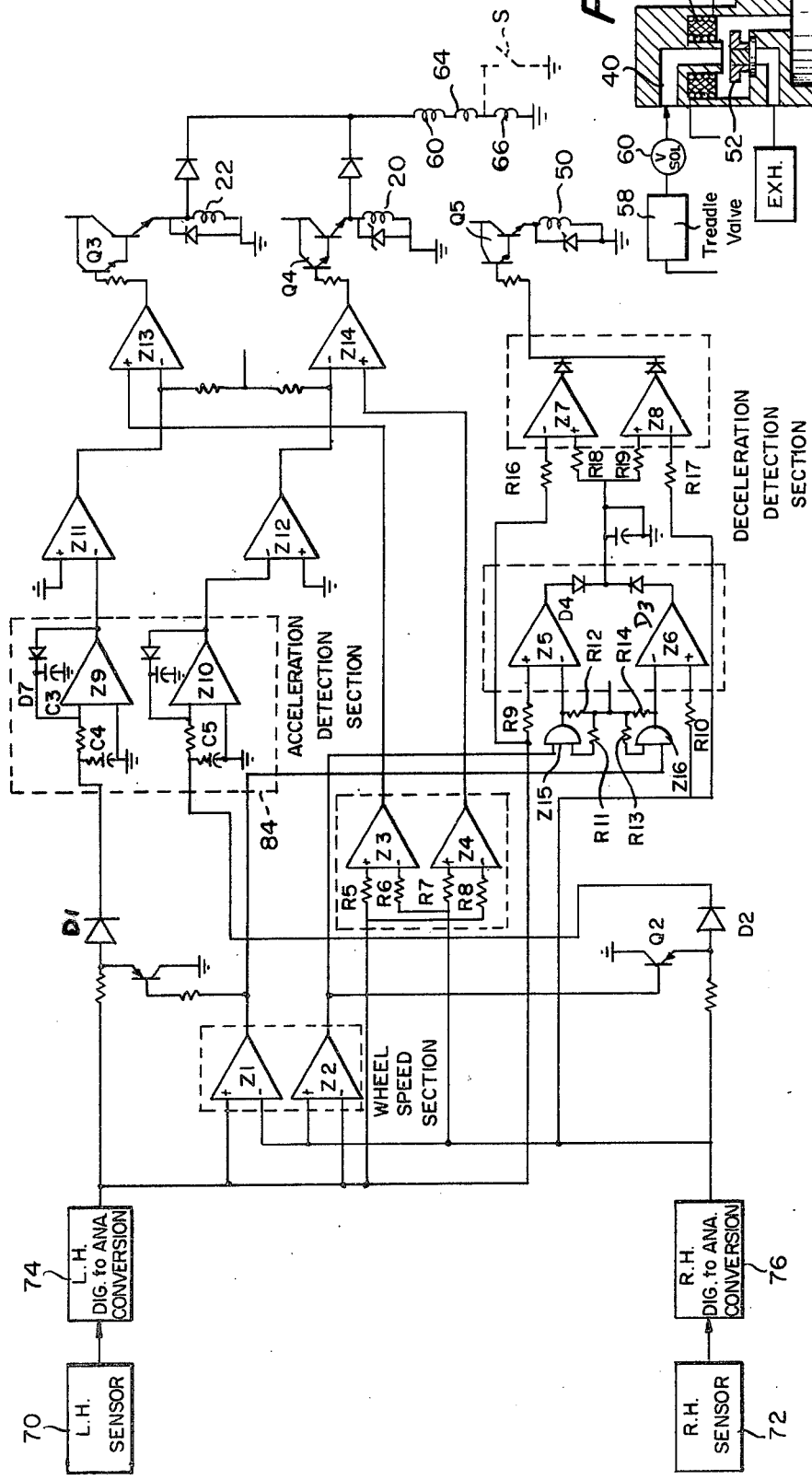
FIG. 2 is an electrical schematic diagram of the logic circuit means of FIG. 1.

Referring now to FIG. 2, the wheel velocity signals from the sensor means 70 and 72 are converted to analog signals by the converter means 74 and 76, respectively, and are supplied to the input terminals of the wheel speed section differential amplifiers Z1 and Z2, the input terminals of the ratio detection differential amplifiers Z3 and Z4, the input terminals of the skid-control input stage differential amplifiers Z5 and Z6, the skid-control output stage differential amplifiers Z7 and Z8, and the input terminals of the differential amplifiers Z9 and Z10 of the acceleration detection section 84. The output terminals of the differential amplifiers Z1 and Z2 are connected with second input terminals to the input stage differential amplifiers Z5 and Z6 via inverting AND gates Z16 and Z15, respectively. The output terminals from the skid-control output stage differential amplifiers Z7 and Z8 are connected with the control transistor stage for the skid-control solenoid 50. Similarly, the output terminals of the ratio detection differential amplifiers Z3 and Z4 are connected to one set of input terminals of the differential amplifiers Z13 and Z14, respectively, and the output terminals of the acceleration detection section 84 are connected to the other set of input terminals to the differential amplifiers Z13 and Z14 via inverting differential amplifiers Z11 and Z12, respectively. The output terminals of the differential amplifiers Z13 and Z14 are connected with the control transistor circuits associated with the left brake solenoid 20 and the right brake solenoid 22, respectively. The pilot solenoid 60 and the bypass solenoid 64 are connected in parallel with both solenoid drivers 20 and 22. Diodes D20 and D22 isolate drivers 20 and 22 from another but allow solenoids 60 and 64 to fire upon activation of either driver.

OPERATION

In operation, assuming that the vehicle is being driven in its normal condition, solenoid valves 20 and 22 are normally open and consequently the left and right wheel brake means are in normal communication with the relay valve. In the event that the operator should operate the foot-controlled treadle valve 58, pressure fluid from the source 14 is supplied to the working chamber 36 via treadle valve 58, normally open solenoid valve 60, pilot conduit 56, inlet 40, and valve seat 42. Owing to the presurization of the working chamber 36, piston 38 is displaced downwardly to cause valve operator 39 to open the relay valve member 30 from its closed position relative to the valve seat 6. Furthermore, owing to the cooperation between the lower extremity of the valve operator 39 and the upper end of the relay valve member 30, the exhaust passage 34 is closed at its upper end, thereby isolating the second chamber portion 4b from the exhaust passage 34. Pressure fluid is now applied to both the left and right wheel brake means from source 14 via the first conduit 12, inlet 8, first chamber portion 4a, outlet ports 10, and solenoid valves 20 and 22, thereby applying the wheel brake means to brake the vehicle. As long as the driven wheels 24 and 26 have comparable rotational velocities, braking of the left and right wheels is simultaneously achieved. Assume now that during this braking operation, one driven wheel (for example, the left driven wheel), has a rotational deceleration that exceeds a predetermined amount. Referring to FIG. 2, because the vehicle is in the decelerating mode, the acceleration detection section 84 renders Q3 and Q4 inoperable, and since the speed of the left wheel is less than that of the right wheel by a predetermined amount, differential amplifier Z2 goes high and differential amplifier Z1 goes low, whereupon AND gate Z15 is enabled to cause differential amplifier Z5 to pass the left wheel speed information through diode D4 to charge the capacitor C1 while AND gate 16 is held in the off condition. As long as the left wheel does not decelerate faster than the limit set by the branch defined by capacitor C1 and resistors R15, R16 and R18, the output of differential amplifier Z7 will stay low. If the left wheel decelerates faster than the time constant and ratio set by this branch circuit, the output of differential amplifier Z7 goes high to operate transistor Q5 to energize the skid-control solenoid 50. When this skid-control solenoid 50 is energized, valve member 52 is attracted upwardly to close the valve seat 42 and to open valve seat 46, whereby the working chamber is exhausted via exhaust port 44. Consequently, piston 38 is displaced upwardly to separate the valve operator 39 from the upper end of the relay valve member 30, whereupon the valve member 30 moves upwardly to a closed position relative to valve seat 6 (thereby to interrupt the communication between the first and second chamber portions 4a and 4b) and the second chamber portion 4b is vented to exhaust via passage 34, whereupon both the left and right wheel brake means 16 and 18 are deactivated. When the skid condition has corrected itself so that the driven wheels again have deceleration ratio less than a predetermined amount, solenoid 50 is de-energized to effect closure of the exhaust port 44 and opening of the valve seat 42, whereupon the working chamber 36 is again supplied with pressure fluid, and relay valve member 32 is displaced downwardly to cause pressure fluid from source 14 to again be supplied to both the left and right wheel brake means via the first chamber portion 4a, valve seat 6 and second chamber portion 4b.

Figure 3:
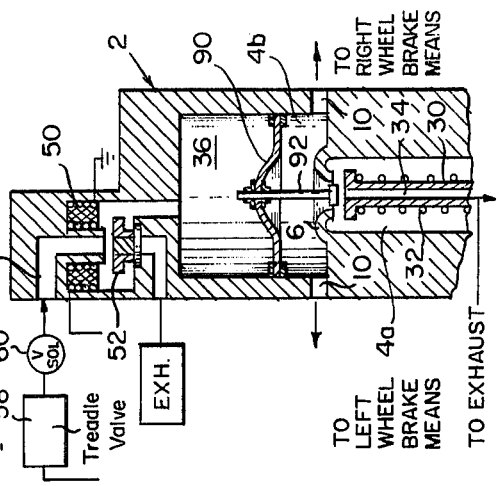
FIG. 3 is a detailed cross-sectional view of a modification of the apparatus of FIG. 1 including pressure motor means of the diaphragm type.

Assume now that the vehicle is in the traction control mode (i.e., the vehicle is in an accelerating condition and one wheel, for example, the left wheel, overruns the other wheel by a predetermined amount, such as might occur on a patch of ice). In this traction control mode, the deceleration detection section including differential amplifiers Z5–Z8 are reduced inoperable, and skid-control solenoid 50 remains de-energized. The wheel speed signal from the differential amplifier Z1 associated with the faster left hand wheel activates the control transistor Q1 via diode D1, allowing acceleration differential amplifiers Z9, Z11, to enable Z13. If the ratio velocities of the left wheel to the right wheel exceeds a predetermined ratio as defined by R5 and R6, Z13 will then energize Q3 to energize solenoids 22, 60 and 64. The differential amplifier Z2 associated with the slower right hand driven wheel causes transistor Q2 to disable differential amplifiers Z10, Z12 and Z14, whereupon transistor Q4 maintains the left hand solenoid valve 20 in its de-energized condition. Since solenoid valve 60 is closed and solenoid valves 64 and 66 are in the open condition, pressure fluid from the first conduit 12 is supplied to the working chamber 36 of the pressure motor means via by-pass conduit 62, inlet port 40, valve seat 42. Consequently, piston 38 is displaced downwardly to open relay valve member 30 from its seat 6, whereupon pressure fluid from the source 14 is supplied to the left wheel brake means 16 via inlet port 8, first chamber portion 4a, valve seat 6, second chamber portion 4b, and solenoid valve 20, the right wheel brake means 18 being deactivated since solenoid valve 22 is in the closed condition. Consequently, the faster left driven wheel 24 is braked to effect the transfer of torque to the slower driven wheel 26 via the differential mechanism 28. When the overrunning traction control condition is corrected, the driven wheels will have generally the same rotational velocities, whereupon solenoid valves 20, 22, 60, and 64 return to their normal de-energized conditions, and the vehicle resumes its normal operator-controlled braking operation. While the pressure motor means for operating the relay valve member 30 have been illustrated in the embodiment of FIG. 1 as being of the piston-cylinder type, it is apparent that diaphragm-type pressure motor means might be used as well, as illustrated in FIG. 3. In this embodiment, the diaphragm 90 carries a valve operating member 92 for opening the relay valve member 30 from its seat 6, and for closing the exhaust passage 34.

Figure 4:
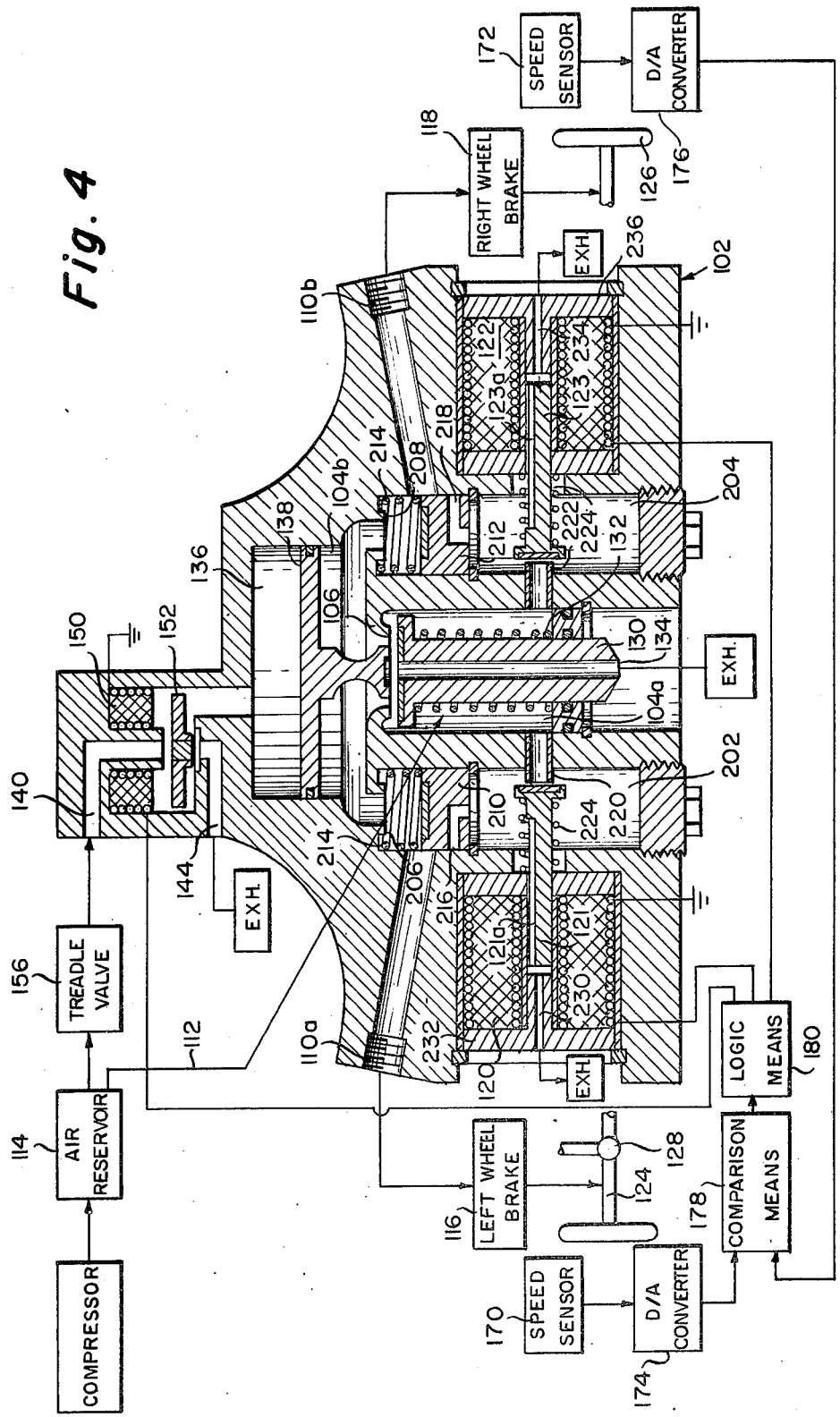
FIG. 4 is a diagrammatic illustration of a second embodiment of the invention wherein the skid-control and traction-control solenoid valve means are mounted within a single unitary housing.

Referring now to the embodiment of FIG. 4, the housing 102 further includes a pair of additional chambers 202 and 204 that are in communication at their upper ends with the second chamber portion 104b via valve seats 206 and 208, respectively. Mounted in the upper ends of these additional chambers are a pair of floating valve members 210 and 212, respectively, that are normally in the illustrated lower position affording communication between the second chamber portion 104b and the outlets 110a, 110b that are in turn directly connected with the left and right wheel brake means 116 and 118, respectively. If desired, springs 214 may be provided for biasing the floating valve members toward their illustrated lower positions. These floating valve members 210 and 212 are adapted for displacement to upper positions in the associated additional chambers in which the floating valve members engage the seats 206 and 208 to isolate the second chamber portion 104b from the outlet ports 110 and from the additional chambers 202 and 204, respectively. When the floating valve members are in their uppermost positions, the lower end of additional chamber 202 is in communication with the associated outlet port 110a via passage 216 contained in the floating valve member 210, and the lower end of additional chamber 204 is in communication with outlet port 110b via the passage 218 contained in floating valve member 212.

As in the embodiment of FIG. 1, fluid from the pressure source 114 is supplied to the first chamber portion 104a via the first conduit means 112. The first chamber portion 104a is also connected with the lower ends of the additional chambers 202 and 204 via valve seat passages 220 and 222, respectively. The wheel brake solenoids 120 and 122 are mounted in corresponding recesses contained in the housing 102 for operating the solenoid valve members 121 and 123 between open and closed positions relative to the valve seats 220 and 222, respectively. These solenoid valve members are normally biased toward their closed positions by springs 224. When the solenoid members are in their closed positions, chamber 202 is vented to exhaust via the longitudinal slot 121a contained in the outer periphery of the left hand portion of the valve member and the through bore 230 contained in the solenoid retaining member 232, and the additional chamber 204 is connected with exhaust via the longitudinal slot 123a contained in the outer periphery of the right hand end of valve member 123, and via the through bore 234 contained in the solenoid retainer member 236. The remaining structure of the apparatus of FIG. 4 corresponds with that of the embodiment of FIG. 1, and the electrical circuit is similar to that of FIG. 2, the only differences being that the connections of the right and left hand brake solenoid means are reversed, and connections similar to the connections to solenoid 60, and 64 are eliminated. In the operation of the embodiment of FIG. 4, when in the anti-skid control mode, solenoid 150 is energized to isolate working chamber 136 from inlet port 140, and to vent the working chamber 136 to exhaust via the exhaust portion 144, whereupon piston 138 is displaced upwardly to permit closing of relay valve member 130 upon its seat 106, and to vent the second chamber portion 104b to exhaust via exhaust passage 134, whereupon the left and right wheel brake means 116 and 118, respectively, are released. When the skid condition is eliminated, solenoid 150 is de-energized, whereupon exhaust port 144 is closed by the solenoid valve member 152, and working chamber 136 is again supplied with pressure fluid via the second inlet port 140, whereupon pressure fluid is simultaneously applied to both of the wheel brake operating means 116 and 118 via first chamber portion 104a, valve seat 106, second chamber 104b, the upper ends of the additional chambers 202 and 204, and outlet ports 110a and 110b, respectively.

Assume now that the vehicle is in an accelerating condition and the velocity of the left driven wheel 124 exceeds that of the right driven wheel 126 by a predetermined amount. In this embodiment, the logic means 180 is operable to energize the solenoid 120, whereupon solenoid valve member 121 is retracted to afford communication between the first chamber portion 104a and the lower end of additional chamber 202 via valve seat passage 220, whereupon the floatng valve member 210 is raised to its upper position against the biasing force of spring 214. Pressure fluid from the source 114 is now supplied to the left wheel brake means 116 from the lower end of additional chamber 202 via the passage 216 and the outlet port 110a. The left drive wheel 124 is now braked, and torque is transferred to the right driven wheel 126 via the differential mechanism 128. When the overrunning condition is terminated and the left and right driven wheels have generally the same rotational velocities, solenoid 120 is de-energized, and solenoid valve member 121 is shifted to the right to close valve seat passage 220, and to vent the left wheel brake means 116 to exhaust via outlet 110a, passage 216, the lower end of additional chamber 202, longitudinal slot 121a, and the through bore 230 contained in the solenoid retainer member 232. As floating member 210 is displaced downwardly by the spring 214 toward the illustrated position, outlet 110a is again brought into communication with the second chamber portion 104b via the valve seat 206. The left and right wheel brake means are then in their released condition. It should be mentioned that the orifices of the passages 216 and 218 are smaller than the dimension of the valve seat passages 220 and 222, respectively, whereby during the traction control braking operations, the associated brake chambers are filled at a controlled rate.

Figure 5:
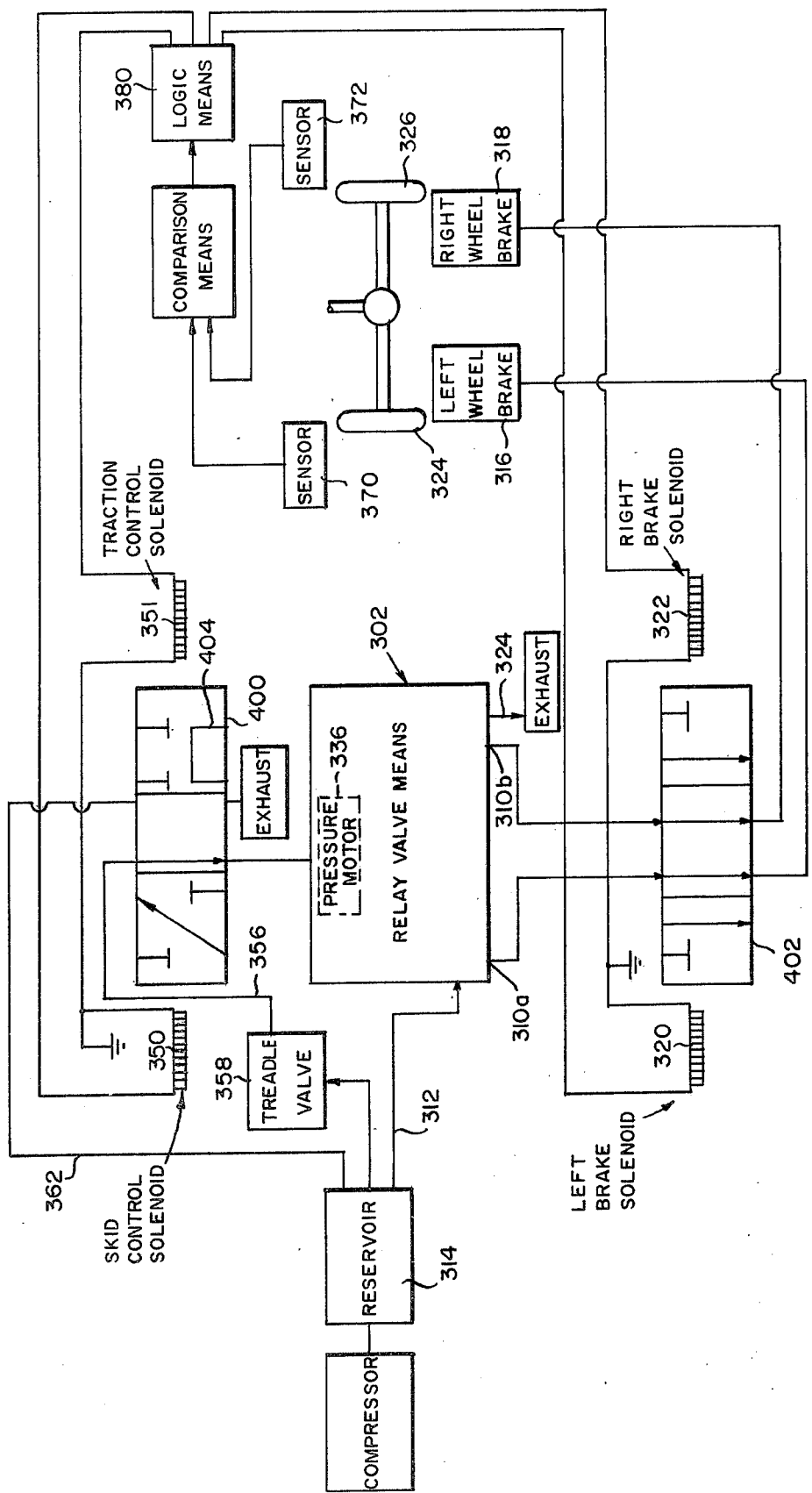
FIG. 5 is a diagrammatic illustration of another embodiment of the invention including spool valve means for effecting the desired skid-control and traction-control operations.

Referring now to the embodiment of FIG. 5, a first spool valve 400 is provided for shifting the apparatus between the skid-control and traction-control modes of operation, and a second spool valve 402 is provided for effecting left wheel braking or right wheel braking when the vehicle is in the traction-control mode. More particularly, the first spool valve 400 has a normal illustrated first position in which the pressure fluid from the source 314 is supplied to the working chamber 336 of the pressure motor means via the operator-controlled valve 358 and the pilot conduit 356. The spool valve 400 has a second position, when skid-control solenoid 350 is energized, to connect the working chamber 336 of the pressure motor means with exhaust via groove 404, the pilot conduit 356 being isolated from the pressure motor means. Furthermore, the spool valve 400 is operable to a third position, when traction-control solenoid 351 is energized and skid-control solenoid is de-energized, to connect the working chamber 336 of the pressure motor means with pressure fluid source 314 via the by-pass line 362. The spool valve 402 has a normal first position in which the outputs 310a, 310b of the relay valve housing are directly connected with the left and right wheel brake means a second position when the left brake solenoid 320 is energized for shifting spool valve 402 to the left so that only the left wheel brake means 316 is activated, the right wheel brake means being isolated from outlet 310b, and a third position when solenoid 322 is energized for connecting outlet 310b with the right wheel brake means 318, the left brake wheel means 316 being isolated from outlet 310a. The operation of this embodiment, of course, corresponds with that previously described with regard to the embodiment of FIG. 1.

While in accordance with the provisions of the Patent Statutes, the preferred forms and embodiments of the invention have been illustrated and described, it will be apparent to those skilled in the art that other changes and modifications may be made without deviating from the inventive concepts set forth above.

What is claimed is:

1. A skid-control traction-control system for a motor vehicle including at least two driven wheels connected by a differential mechanism, and at least two wheel brake means associated with said driven wheels, respectively, comprising
   (a) means operable to supply pressure fluid to each of said wheel brake means, respectively;
   (b) wheel velocity sensing means associated with each of the driven wheels, respectively;
   (c) skid-control means operable by said wheel sensing means when the vehicle is in a brake-applied decelerating condition and the wheel deceleration of either wheel exceeds a predetermined amount for disabling both of said wheel brake means; and
   (d) traction-control means operable by said wheel sensing means when the vehicle is in a brake-released accelerating condition and the wheel velocity of one driven wheel exceeds that of the other driven wheel by a predetermined amount for operating only the wheel brake means associated with the faster driven wheel, thereby to effect the transfer of torque from the faster driven wheel to the slower driven wheel via the differential mechanism;
   (e) said skid-control means comprising
      (1) a valve housing containing a chamber divided into first and second portions by a valve seat, said valve housing including an inlet in communication with said first chamber portion, and a pair of outlets in communication with said second chamber portion, said outlets being connected with said wheel brake means, respectively;
      (2) a relay valve member normally closing said valve seat;
      (3) pressure motor means operable to open said relay valve member from said valve seat; said pressure motor means including
         (a) means defining a working chamber in said housing;
         (b) valve operating means movably connected with said housing for displacement, upon the pressurization of said working chamber, in a direction to open said relay valve means relative said valve seat;
         (c) an operator-controlled valve; and
         (d) pilot conduit means connecting said operator-controlled valve in series between said pressure fluid source and said working chamber;

(4) first vent means for venting said second chamber portion;

(5) second vent means for venting said working chamber; and (6) skid-control solenoid means connected in said pilot conduit means between said operator-controlled valve and said working chamber, said skid-control solenoid valve means having an enabling condition in which said pressure motor means is operable to open said relay valve member and to close said first vent means, and a disabling condition in which said pressure motor means is disabled to cause said relay valve member to be in the closed position and the first vent means to be open, said skid-control solenoid valve means being operable in the enabling condition to connect said working chamber with said pilot conduit means and to isolate said working chamber from said second vent means, said skid-control operating means being operable in the disabling condition to connect said working chamber with said second vent means and to isolate said working chamber from said pilot conduit means;

(f) said pressure fluid supply means including (1) a source of pressure fluid; and (2) first conduit means connecting said source with said inlet, whereby when said skid-control solenoid means is in its enabling condition, pressure fluid from said source is supplied to both said wheel brake means via said first conduit, said inlet, said first chamber portion, and said outlets, respectively;

(g) said housing further containing a pair of additional chambers each in communication at one end with said second chamber portion, said housing also including a pair of outlet passages connecting said outlets with said one ends of said additional chambers, respectively;

(h) said traction control means including (1) a pair of brake valve seats contained in said housing for providing communication between said first chamber portion and the other ends of said additional chambers, respectively;

(2) a pair of traction control solenoid valve means having disabling and enabling conditions for closing and opening the associated brake valve seats, respectively, said traction control solenoid valve means normally being in the disabling condition;

(3) a pair of floating valve members arranged for movement in said additional chambers, respectively, each of said floating valve members being movable between a normal first position in which the associated outlet port is isolated from said brake valve seat and is in communication with said second chamber portion via said additional chamber one end, and a second portion in which the associated outlet is in communication with said brake valve seat via the other end of said additional chamber, said floating valve member being operable to its second position when the associated traction control solenoid valve is in the enabling condition; and (4) a pair of third vent means for venting the other ends of and additional chambers, respectively, when the associated traction control solenoid valve means are in the disabling condition, respectively, said traction control means being operable when the vehicle is in the traction control mode to operate to the enabling condition the traction control solenoid valve means associated with the faster driven wheel, thereby to effect braking of the same.

2. Apparatus as defined in claim 1, wherein each of said floating valve members contains a passage affording communication between the associated outlet and the other end of the associated additional chamber when said floating valve member is in the second position, said passage having an orifice in the surface of the floating valve member facing said other end of the additional chamber, the diameter of said orifice being smaller than that of the associated brake valve seat.

3. Apparatus as defined in claim 2, and further including spring means biasing each of said floating valve members toward its first position.

4. Apparatus as defined in claim 3, and further wherein each of said floating valve member includes on the surface thereof remote from said one additional chamber end valve means for closing a corresponding valve seat in said housing to interrupt communication between said second chamber portion and said one additional chamber end.

5. Apparatus as defined in claim 1, wherein each of said traction control solenoid valve means includes a stator and an armature, spring means normally biasing said armature, when said traction control solenoid means is in the disabling condition, toward an extended position effecting closure of the corresponding brake valve seat; and further wherein each of said third vent means includes a passage extending longitudinally through the associated traction control solenoid means, and means closing said passage when said traction control solenoid means is in the enabling condition and said armature is in a retracted position against the biasing force of said spring means.

6. A skid-control traction-control system for a motor vehicle including at least two driven wheels connected by a differential mechanism, and at least two wheel brake means associated with said driven wheels, respectively, comprising (a) means operable to supply pressure fluid to each of said wheel brake means, respectively;

(b) wheel velocity sensing means associated with each of the driven wheels, respectively;

(c) skid-control means operable by said wheel sensing means when the vehicle is in a brake-applied decelerating condition and the wheel deceleration of either wheel exceeds a predetermined amount for disabling both of said wheel brake means; and (d) traction-control means operable by said wheel sensing means when the vehicle is in a brake-released accelerating condition and the wheel velocity of one driven wheel exceeds that of the other driven wheel by a predetermined amount for operating only the wheel brake means associated with the faster driven wheel, thereby to effect the transfer of torque from the faster driven wheel to the slower driven wheel via the differential mechanism;

(e) said skid-control means comprising (1) a valve housing containing a chamber divided into first and second portions by a valve seat, said valve housing including an inlet in communication with said first chamber portion, and a pair of outlets in communication with said second chamber portion, said outlets being connected with said wheel brake means, respectively;

(2) a relay valve member normally closing said valve seat;

(3) pressure motor means operable to open said relay valve member from said valve seat, said pressure motor means including (a) means defining a working chamber in said housing;

(b) valve operating means movably connected with said housing for displacement, upon the pressurization of said working chamber, in a direction to open said relay valve means relative said valve seat;

(c) an operator-controlled valve; and (d) pilot conduit means connecting said operator-controlled valve in series between said pressure fluid source and said working chamber;

(4) first vent means for venting said second chamber portion;

(5) second vent means for venting said working chamber; and (6) skid-control solenoid means connected in said pilot conduit means between said operator-controlled valve and said working chamber, said skid-control solenoid valve means having an enabling condition in which said pressure motor means is operable to open said relay valve member and to close said first vent means, and a disabling condition in which said pressure motor means is disabled to cause said relay valve member to be in the closed position and the first vent means to be open, said skid-control solenoid valve means being operable in the enabling condition to connect said working chamber with said pilot conduit means and to isolate said working chamber from said second vent means, said skid-control operating means being operable in the disabling condition to connect said working chamber with said second vent means and to isolate said working chamber from said pilot conduit means, said skid-control solenoid valve means comprising a first spool valve operable between a first position in which said pressure motor means is connected with said source via said operator-controlled valve, a second position in which said pressure motor means is connected with exhaust, and a third position for connecting said pressure motor means with said source, said first spool valve normally being in the first position, a skid-control mode solenoid for displacing said first spool valve from said first position to said second position, and a traction control mode solenoid for shifting said spool valve from said first position to said third position;

(f) said pressure fluid supply means including (1) a source of pressure fluid; and (2) first conduit means connecting said source with said inlet, whereby when said skid-control solenoid means is in its enabling condition, pressure fluid from said source is supplied to both said wheel brake means via said first conduit, said inlet, said first chamber portion, and said outlets, respectively.

7. Apparatus as defined in claim 6, wherein said traction control means further includes a second spool valve having a first position affording communication between both of said outlets and said wheel brake means, respectively, a second position connecting only one of said outlets with one of said wheel brake means, the other outlet being isolated from its wheel brake means, and a third position connecting only the other of said outlets with the other of said wheel brake means, said one outlet being isolated from its wheel brake means, said second spool valve normally being in the first position, a second solenoid for shifting said second spool valve to the second position, and a third solenoid for shifting the second spool valve to its third position.

8. A skid-control traction-control system for a motor vehicle including at least two driven wheels connected by a differential mechanism, and at least two wheel brake means associated with said driven wheels, respectively, comprising (a) means operable to supply pressure fluid to each of said wheel brake means, respectively;

(b) wheel velocity sensing means associated with each of the driven wheels, respectively;

(c) skid-control means operable by said wheel sensing means when the vehicle is in a brake-applied decelerating condition and the wheel deceleration of either wheel exceeds a predetermined amount for disabling both of said wheel brake means; and (d) traction-control means operable by said wheel sensing means when the vehicle is in a brake-released accelerating condition and the wheel velocity of one driven wheel exceeds that of the other driven wheel by a predetermined amount for operating only the wheel brake means associated with the faster driven wheel, thereby to effect the transfer of torque from the faster driven wheel to the slower driven wheel via the differential mechanism;

(e) said skid-control means comprising (1) a valve housing containing a chamber divided into first and second portions by a valve seat, said valve housing including an inlet in communication with said first chamber portion, and a pair of outlets in communication with said second chamber portion, said outlets being connected with said wheel brake means, respectively;

(2) a relay valve member normally closing said valve seat;

(3) pressure motor means operable to open said relay valve member from said valve seat, said pressure motor means including (a) means defining a working chamber in said housing;

(b) valve operating means movably connected with said housing for displacement, upon the pressurization of said working chamber, in a direction to open said relay valve means relative said valve seat;

(c) an operator-controlled valve; and (d) pilot conduit means connecting said operator-controlled valve in series between said pressure fluid supply means and said working chamber;

(4) first vent means for venting said second chamber portion;

(5) second vent means for venting said working chamber; and (6) skid-control solenoid means connected in said pilot conduit means between said operator-controlled valve and said working chamber, said skid-control solenoid valve means having an enabling condition in which said pressure motor means is operable to open said relay valve member and to close said first vent means, and a disabling condition in which said pressure motor means is disabled to cause said relay valve member to be in the closed position and the first vent means to be open, said skid-control solenoid valve means being operable in the enabling condition to connect said working chamber with said pilot conduit means and to isolate said working chamber from said second vent means, said skid-control operating means being operable in the disabling condition to connect said working chamber with said second vent means and to isolate said working chamber from said pilot conduit means;

(f) said pressure fluid supply means including
  (1) a source of pressure fluid; and
  (2) first conduit means connecting said source with said inlet, whereby when said skid-control solenoid means is in its enabling condition, pressure fluid from said source is supplied to both said wheel brake means via said first conduit, said inlet, said first chamber portion, and said outlets, respectively;

(g) said wheel velocity sensing means including logic means containing
  (1) a normally disabled deceleration detection section for operating said skid-control means;
  (2) a normally disabled acceleration section for controlling the operation of said traction control means, said acceleration detection section including a pair of output terminals connected with the wheel brake means associated with the driven wheels, respectively; and
  (3) a wheel speed section including a pair of wheel speed differential amplifiers having input terminals to which the wheel speed signals are supplied, first means connecting the output terminals of said differential amplifiers with the input terminals of the acceleration detection section, and means including and gates connecting the output terminals of the differential amplifiers with the input terminals of the deceleration detection section.

* * * * *